(12) United States Patent
De Boer et al.

(10) Patent No.: US 11,371,931 B2
(45) Date of Patent: Jun. 28, 2022

(54) METHODS AND INSTRUMENTS FOR MEASURING SAMPLES IN A WELL PLATE

(71) Applicant: Nederlandse Organisatie voor toegepast-natuurwetenschappelijk onderzoek TNO, 's-Gravenhage (NL)

(72) Inventors: Bart Michiel De Boer, Rotterdam (NL); Peter Johan Harmsma, Vleuten (NL); Michiel Peter Oderwald, Delft (NL); Teunis Cornelis Van Den Dool, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 381 days.

(21) Appl. No.: 16/481,763

(22) PCT Filed: Jan. 12, 2018

(86) PCT No.: PCT/NL2018/050021
§ 371 (c)(1),
(2) Date: Jul. 29, 2019

(87) PCT Pub. No.: WO2018/143794
PCT Pub. Date: Aug. 9, 2018

(65) Prior Publication Data
US 2021/0356389 A1   Nov. 18, 2021

(30) Foreign Application Priority Data

Jan. 31, 2017 (EP) ..................... 17153867
Apr. 11, 2017 (EP) ..................... 17165947

(51) Int. Cl.
*G01N 21/25* (2006.01)
*G01N 21/85* (2006.01)
*G02B 6/42* (2006.01)

(52) U.S. Cl.
CPC ....... *G01N 21/253* (2013.01); *G01N 21/8507* (2013.01); *G02B 6/4206* (2013.01); *G01N 2201/0873* (2013.01)

(58) Field of Classification Search
CPC ............. G01N 21/253; G01N 21/8507; G01N 2201/0873; G01N 21/59; G01N 35/00623;
(Continued)

(56) References Cited

U.S. PATENT DOCUMENTS

| 5,082,629 A | 1/1992 | Burgess, Jr. et al. |
| 6,388,751 B1 * | 5/2002 | Holley ................. G01N 21/253 356/436 |

(Continued)

FOREIGN PATENT DOCUMENTS

| WO | 2007077218 A1 | 7/2007 |
| WO | 2015152717 A1 | 10/2015 |

OTHER PUBLICATIONS

Mar. 26, 2018, International Search Report and Written Opinion, PCT/NL2018/050021.

(Continued)

*Primary Examiner* — Isiaka O Akanbi
(74) *Attorney, Agent, or Firm* — Banner & Witcott, Ltd.

(57) ABSTRACT

Methods and instruments for measuring a liquid sample (S1) in a well plate (50) by means of an optical chip 10. The chip (10) comprises an optical sensor (13) that is accessible to the liquid sample (S1) at a sampling area (SA) of the chip. A free-space optical coupler (11,12) is accessible to receive input light (L1) and/or emit output light (L2) via a coupling area (CA) of the chip (10). The sampling area (SA) of the chip 10 is submerged in the liquid sample (S1) while keeping the liquid sample (S1) away from the coupling area (CA) for interrogating the optical coupler (11,12) via an (Continued)

optical path (P) that does not pass through the liquid sample (S1).

18 Claims, 9 Drawing Sheets

(58) Field of Classification Search
CPC .... G01N 35/10; G01N 35/1016; G01N 21/78; G02B 6/4206; G01F 25/00
USPC ........................................ 356/244, 128, 418
See application file for complete search history.

(56) References Cited

U.S. PATENT DOCUMENTS

| | | | |
|---|---|---|---|
| 6,469,785 B1* | 10/2002 | Duveneck | G01N 21/648 356/244 |
| 7,796,262 B1 | 9/2010 | Wang et al. | |
| 7,879,619 B2* | 2/2011 | Jing | G01N 21/553 356/132 |
| 2005/0110989 A1 | 5/2005 | Schermer et al. | |
| 2006/0240573 A1* | 10/2006 | Kao | G01N 21/78 436/524 |
| 2011/0183409 A1 | 7/2011 | Newby et al. | |
| 2012/0092650 A1 | 4/2012 | Gunn, III et al. | |
| 2016/0357007 A1* | 12/2016 | Swanson | G02B 6/3548 |
| 2017/0115206 A1* | 4/2017 | De Boer | G01N 21/552 |

OTHER PUBLICATIONS

John Comley, "Label-Free Detection New biosensors facilitate broader range of drug discovery applications", Drug Discovery World, Winter May 2004, pp. 63-74.

Shaopeng Wang et al., "Integrated microring resonator biosensors for monitoring cell growth and detection of toxic chemicals in water", Biosensors and Bioelectronics, 2009, vol. 24, pp. 3061-3066.

Clinton Smith et al., "Sensing nitrous oxide with QCL-coupled silicon-on-sapphire ring resonators", Optics Express, 2015, vol. 23, issue 5, pp. 5491-5499.

Daniela Ullien et al., "Protein detection on biotin-derivatized polyallylamine by optical microring resonators", Jun. 30, 2014, Optics Express, vol. 22, No. 13, pp. 16585-16594.

* cited by examiner

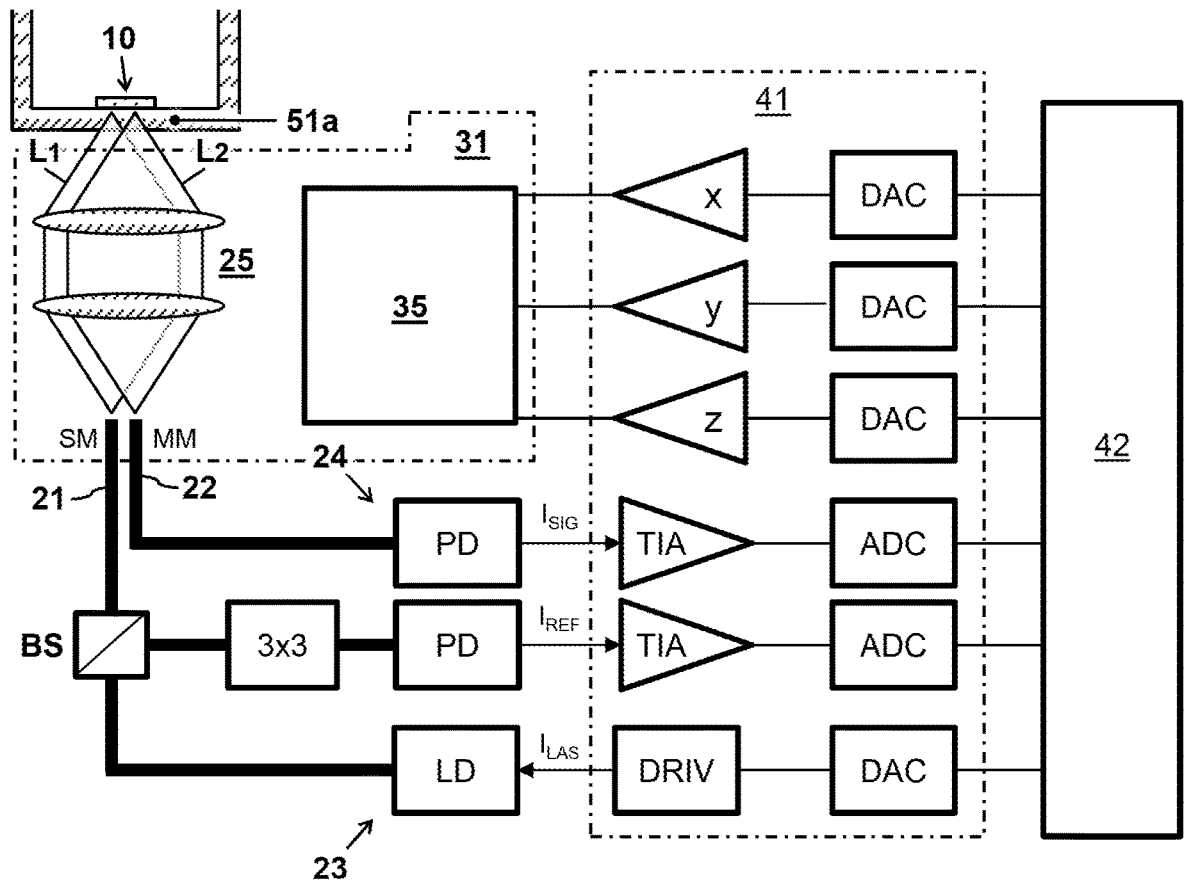
FIG 5A
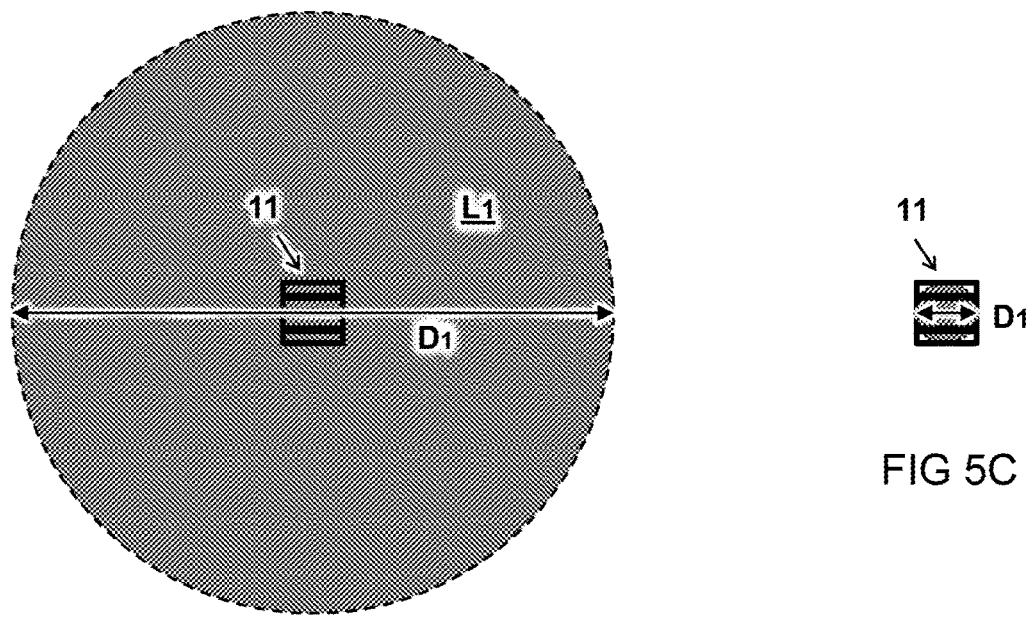
FIG 5B
FIG 5C

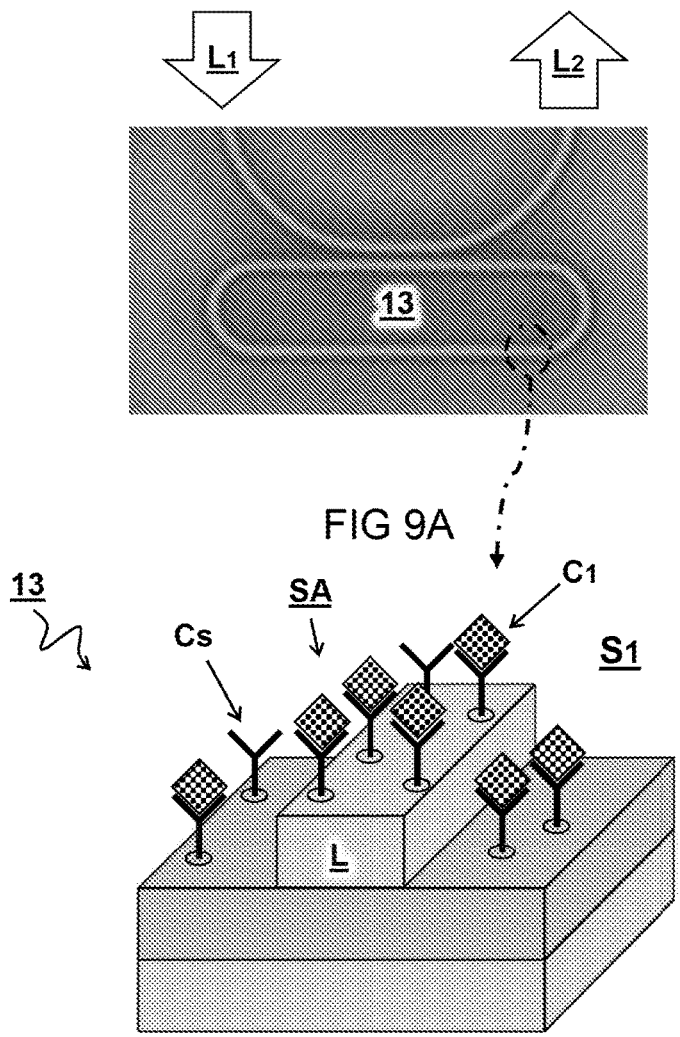
FIG 9A
FIG 9B
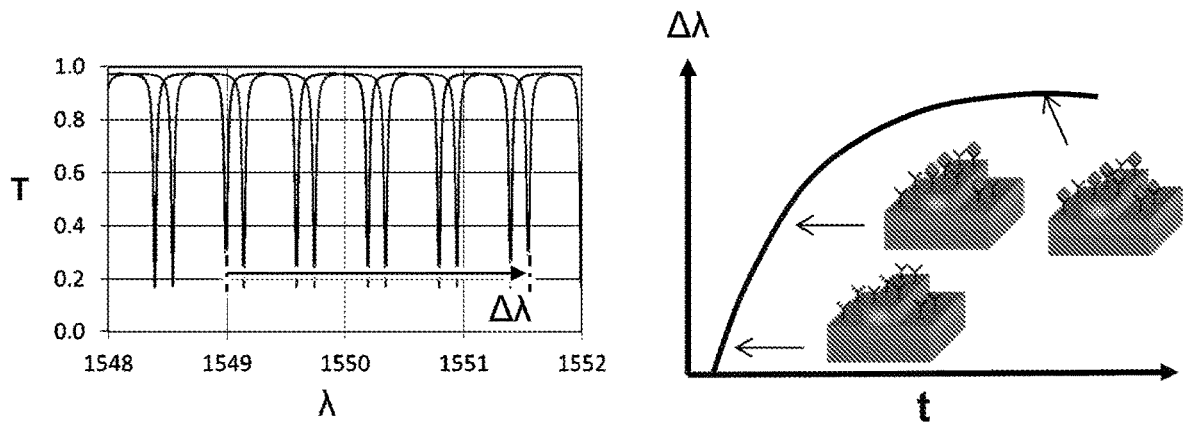
FIG 9C
FIG 9D

METHODS AND INSTRUMENTS FOR MEASURING SAMPLES IN A WELL PLATE

CROSS-REFERENCE TO RELATED APPLICATIONS

This application is a U.S. National Stage application under 35 U.S.C. § 371 of International Application PCT/NL2018/050021 (published as WO 2018/143794 A1), filed Jan. 12, 2018 which claims the benefit of priority to Application EP 17153867.1, filed Jan. 31, 2017, and to Application EP 17165947.7, filed Apr. 11, 2017. Benefit of the filing date of each of these prior applications is hereby claimed. Each of these prior applications is hereby incorporated by reference in their entirety.

TECHNICAL FIELD AND BACKGROUND

The present disclosure relates to methods and instruments for measuring samples in a well plate. The disclosure also relates to an adapted well plate.

A well plate is commonly used in the analysis of a liquid samples, e.g. measurement of analyte concentrations or other properties for an array of different samples. The well plate (also referred to as microplate, microwells, microtiter, multiwell plate) is a flat plate that looks like a tray with multiple wells that are used as small test tubes for the liquid samples. Well plates are commonly manufactured in a 2:3 rectangular mix with 96, 384, or 1536 wells. Recent advances in photonic circuitry may allow the measurement of various properties in a liquid sample, e.g. serum, blood, et cetera. However, the measurement of samples in a well plate by means of an optical chip is hindered by difficulty in obtaining an optical coupling with the chip. An optical fiber can be attached to the chip, but this is difficult and makes the chip too expensive to be disposable. And free-space coupling without connected fibers is difficult because the chip is typically covered in fluid of unknown optical properties or even opaque.

It is thus desired to provide a more versatile solution for measuring liquid samples in a well plate.

SUMMARY

One aspect of the present disclosure provides a method of measuring a liquid sample in a well plate by means of an optical chip. Further aspects may relate to a well plate with optical chips or an instrument with optical chip for measuring samples in a well plate. The optical chip comprises an optical sensor that is accessible to the liquid sample at a sampling area of the chip. The chip also comprises at least one free-space optical coupler that is accessible to receive input light and/or emit output light via a coupling area of the chip. The optical chip is configured to modify the output light with respect to the input light as a function of a property to be measured of the liquid sample proximate to the sampling area. The sampling area of the chip is submerged in the liquid sample while the liquid sample is kept away from the coupling area. This allows interrogating the optical coupler via an optical path that does not pass through the liquid sample. Accordingly, the chip can be readout via an inexpensive free-space coupling without the sample interfering with the free-space optical connection.

By keeping the coupling area of the chip in contact with a surface of the well, the coupling can be shielded from the liquid sample. By using a transparent well material at the interrogation wavelength, the optical path may extend from an external interrogator unit, through the well surface, directly to the contacting coupling area. For example, the chip may be glued to a bottom of the well for easy read out from the bottom of the well plate. The coupling area can also be shielded from the sample by a liquid tight barrier, e.g. sleeve around the chip to keep the couplers accessible to free-space optical interrogation even if the chip is submerged below the liquid level. For example, the chip with sleeve may be part of an optical instrument that is dipped into the sample. By carefully position control, it is also possible to keep the coupling part of chip above the liquid level while only submerging the sampling area.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 5A illustrates an overview of example components in an optical measurement system;

FIG. 5B illustrates a relatively large light spot projected over a free space input coupler;

FIG. 5C illustrates a relatively small light spot projected over a free space input coupler;

FIG. 9A illustrates a picture of an embodiment optical sensor as ring resonator;

FIG. 9B illustrates coating on the ring resonator for detecting an analyte;

FIG. 9C illustrates a graph with wavelength shift of spectral features as function of analyte concentration;

FIG. 9D illustrates the wavelength shift as function of time.

DESCRIPTION OF EMBODIMENTS

Figure 1A:
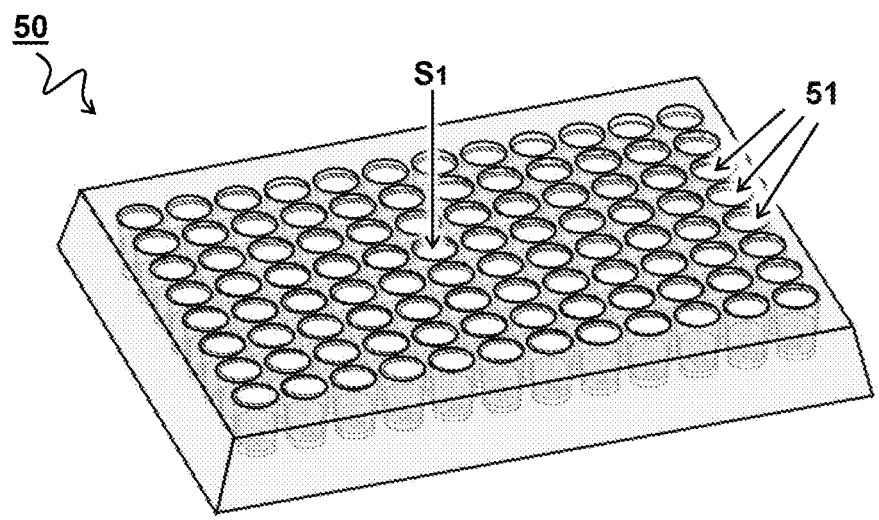
FIG. 1A illustrates a perspective view of an embodiment of a well plate.

In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
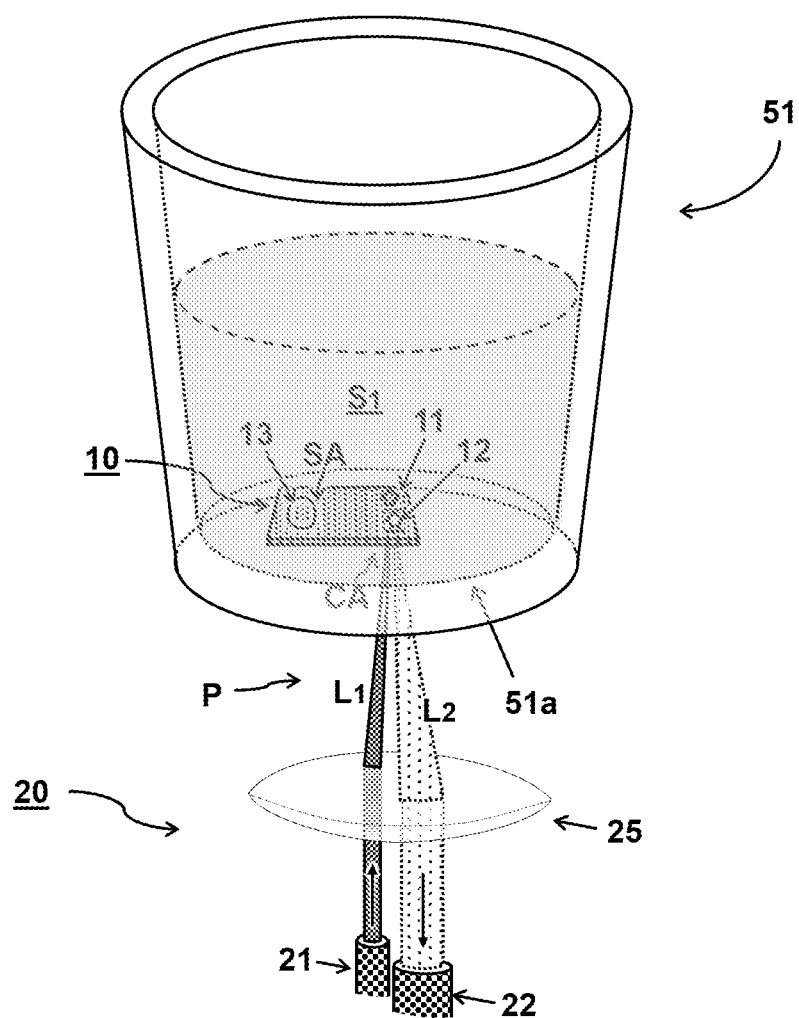
FIG. 1B illustrates a perspective view of an embodiment for measuring a liquid sample in a well by means of a chip contacting a well surface.

FIG. 1A illustrates a perspective view of an embodiment of a well plate 50. FIG. 1B illustrates a perspective view of an embodiment for measuring a liquid sample S1 in one of the wells 51 by means of an optical chip 10.

In one embodiment, the optical chip 10 comprises an optical sensor 13 that is accessible to the liquid sample S1 at a sampling area SA of the chip. In another or further embodiment, the optical chip 10 comprises one or more free-space optical couplers 11,12 that are accessible to receive input light L1 and/or emit output light L2 via a coupling area CA of the chip. Typically, the optical chip 10 is configured to modify the output light L2 with respect to the input light L1 as a function of a property to be measured of the liquid sample S1 proximate to the sampling area SA.

One method of measuring a liquid sample S1 in a well plate 50 comprises submerging the sampling area SA in the liquid sample S1 while keeping the liquid sample S1 away from the coupling area CA. This allows interrogating the optical coupler 11,12 via an optical path P that does not pass through the liquid sample S1.

In the embodiment shown, the coupling area CA of the optical chip 10 is in contact with a well surface 51a of a well 51 in the well plate 50. The well surface 51a shields the coupling area CA from the liquid sample S1 and is transparent to the input and output light L1,L2. Accordingly, the optical path P extends from the coupling area CA through the transparent well surface 51a. For example, the well plate 50 is made of polystyrene, polycarbonate or PMMA which may be transparent at typical wavelengths of e.g. 850 nm, 1550 nm, et cetera.

In the embodiment shown, the optical chip 10 is in contact with a bottom surface 51a of the well 51. While other surfaces may be used, the bottom may be advantageous because it is typically a flat surface which is relatively easy to access for an external instrument. In one embodiment, the bottom surface of the wells 51 in the well plate 50 is an optical surface, e.g. flat and/or polished, optionally with an anti-reflection coating for the light L1,L2 used for interrogating the optical coupler 11,12. Preferably, the optical chip 10 is attached to the surface 51a of the well 51. For example, the chip 10 is attached or bonded to the surface 51 by an adhesive, e.g. glue. The chip 10 may also be partly integrated into a surface of the well 51.

Typically, the optical sensor 13 is arranged on a face of the optical chip 10 directed towards the liquid sample S1. In one embodiment, the optical coupler 11,12 is arranged on a face of the optical chip 10 directed towards the surface 51a of the well 51. In one embodiment, the optical sensor 13 and the optical coupler 11,12 are arranged on opposite faces of the optical chip 10. In another or further embodiment, the optical coupler 11,12 is arranged on a side of the optical chip 10 perpendicular to a face of the optical chip 10 comprising the optical sensor 13. In some embodiments, the optical chip 10 is transparent to the input and/or output light for optically interrogating the optical coupler 11,12 through the chip 10, e.g. a silicon based chip that is interrogated by infrared light. In such embodiments, the optical coupler 11,12 may face away from the surface 51a of the well 51. For example, the optical sensor 13 and the optical coupler 11,12 are arranged on the same face of the optical chip 10 which may be easier to manufacture.

In one embodiment, the optical chip 10 comprises a free-space input coupler 11 configured to receive input light L1 for the optical sensor 13 into the chip. In another or further embodiment, the optical chip 10 comprises a free-space output coupler 12 configured to emit output light L2 from the optical sensor 13 out of the chip. In some embodiments, an optical coupler is used for both receiving input light L1 and emitting output light L2. In other or further embodiments, the optical chip 10 comprises multiple input and/or output couplers 11,12 to read out a plurality of optical sensors on the chip.

In one embodiment, the input light L1 is imaged from a remote light source as a light spot onto a part of the coupling area CA associated with the input coupler 11. In particular, the input light spot is imaged through free space. Typically, the input light spot is imaged by projection optics 25, e.g. one or more lenses 25 and/or curved mirrors (not shown). In the embodiment shown, the input light L1 is provided by a light guide 21, e.g. optical fiber. In one embodiment, the light guide has an optical exit surface, e.g. end of the optical fiber, arranged in an object plane of the projection optics 25 for imaging the exit surface onto the input coupler 11.

In one embodiment, the output light L2 from a part of the coupling area CA associated with the output coupler 12 is imaged onto a light guide 22, e.g. using the same or separated projection optics 25. In some embodiments, a first light guide 21 for delivering the input light L1 has a smaller diameter than a second light guide 22 for receiving the output light L2, e.g. smaller by a factor of at least two, four, or eight. For example, the first light guide 21 is a single mode (SM) fiber and the second light guide 22 is a multimode (MM) fiber.

Typically, the well plate 50 comprises a plurality of wells 51, e.g. at least ten, twenty, forty, or more. To keep the well plate 50 compact, the wells 51 may be arranged in a matrix. For example, well plates are commonly manufactured in a two by three rectangular configuration with 96, 384, or 1536 wells. Also other numbers and configurations are possible.

Figure 2:
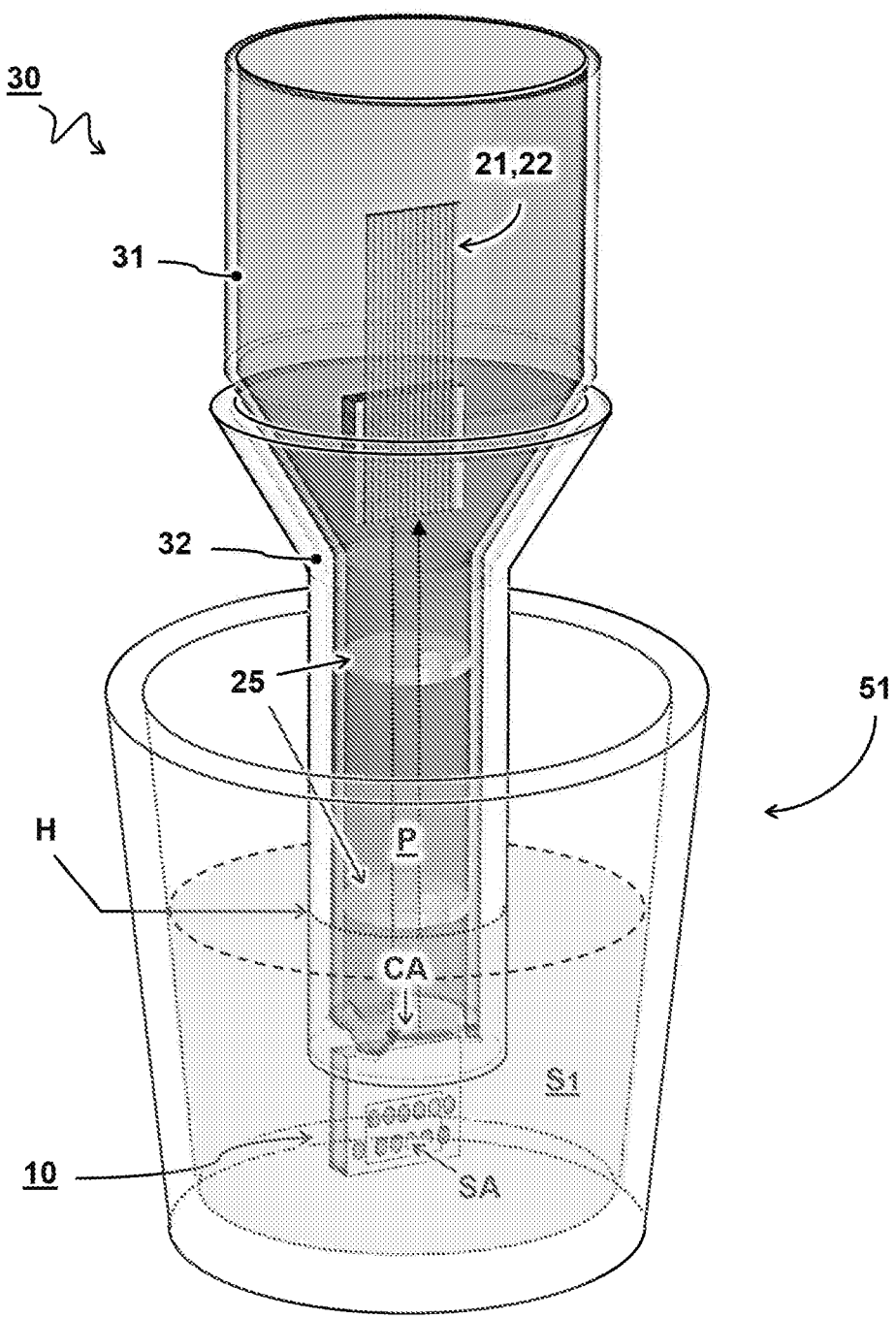
FIG. 2 illustrates a perspective view of an embodiment for measuring a liquid sample in a well by means of a chip integrated with a liquid tight sleeve.

FIG. 2 illustrates a perspective view of an embodiment for measuring a liquid sample S1 in a well 51 by means of an optical chip 10 integrated with a liquid tight sleeve 32.

In one embodiment, the optical chip 10 is held by a liquid tight sleeve 32 configured to shield the coupling area CA from the liquid sample S1 while keeping the sampling area SA exposed. Accordingly, the optical path P may extend from the coupling area CA through an interior free space inside the sleeve 32. In this way the sleeve 32 keeps the optical coupler 11,12 free of the liquid sample S1 and allows interrogating the optical coupler 11,12 via the interior free space 26a even when the optical coupler 11,12 is held below a liquid level H of the liquid sample S1 without the output light L2 propagating through the liquid sample S1.

In one embodiment, the optical chip 10 is interrogated via an optical instrument 30 comprising a projection system 25 inside a probe head 31 that is at least partly inserted into the liquid tight sleeve 32 to establish an optical path P between the optical instrument 30 and the optical chip 10. Preferably, the optical path P comprises a free space path inside the optical instrument 30 between light guides 21,22 and the coupling area CA of the optical chip 10. Each of the input light guide 21 and/or output light guide 22 may comprise one or more optical fibers, e.g. one input light guide and a plurality of output light guides.

Figure 3A:
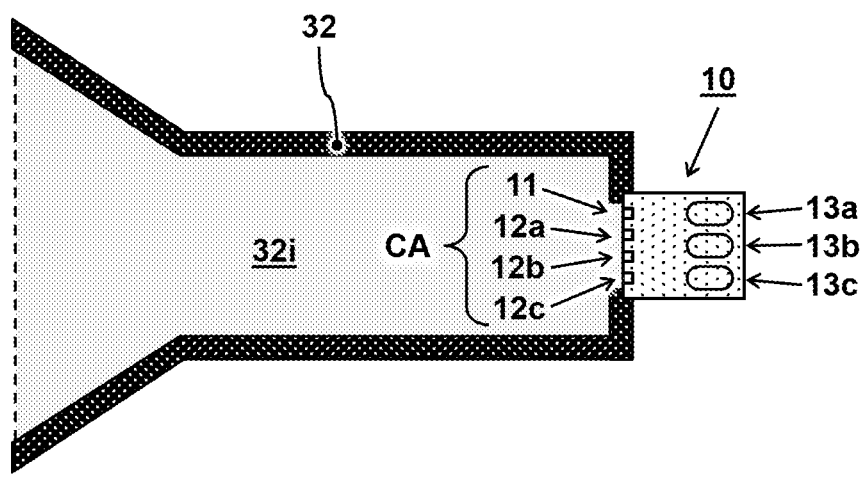
FIG. 3A illustrates a cross-section view of an embodiment of a liquid tight sleeve with optical chip.

FIG. 3A illustrates a cross-section view of an embodiment of a liquid tight sleeve 32 with optical chip 10. In the embodiment shown, the optical chip 10 is integrally connected to the sleeve 32 to form a liquid tight interior space 32i. Preferably, one or more optical couplers 11,12a,12b,12c of the optical chip 10 are arranged towards an inside of the sleeve 32 facing the interior space 32i. In the embodiment shown, the couplers are arranged at a hole through the sleeve 32. Alternatively, at least a bottom of the sleeve comprises transparent material, wherein the couplers are arranged to couple the light through the transparent material. Furthermore, one or more optical sensors 13a,13b,13c of the optical chip 10 are arranged at an outside of the sleeve 32.

Figure 3B:
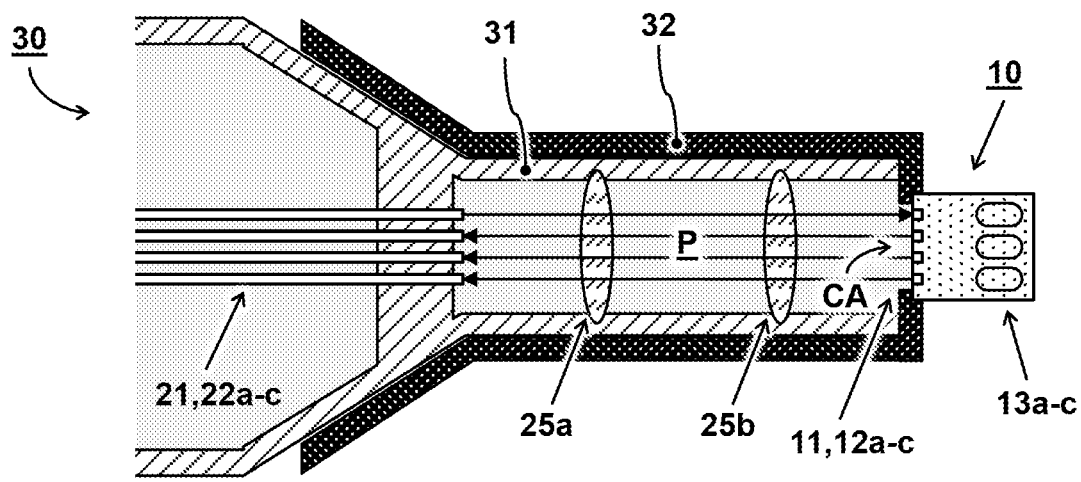
FIG. 3B illustrates a cross-section view of an embodiment for a probe head inserted in the liquid tight sleeve for readout of the chip.

FIG. 3B illustrates a cross-section view of an embodiment for a probe head 31 inserted in the liquid tight sleeve 32 for readout of the optical chip 10. In the embodiment shown, the probe head 31 comprises a protrusion that tightly fits inside the inner diameter of the sleeve 32. Preferably, the protrusion forms a connection with a bottom of the sleeve 32. In one embodiment, a connection between the probe head 31 of the optical instrument 30 and the sleeve 32 establishes an optical path P between light guides 21,22 inside the optical instrument 30 and the coupling area CA of the optical chip 10.

Figure 3C:
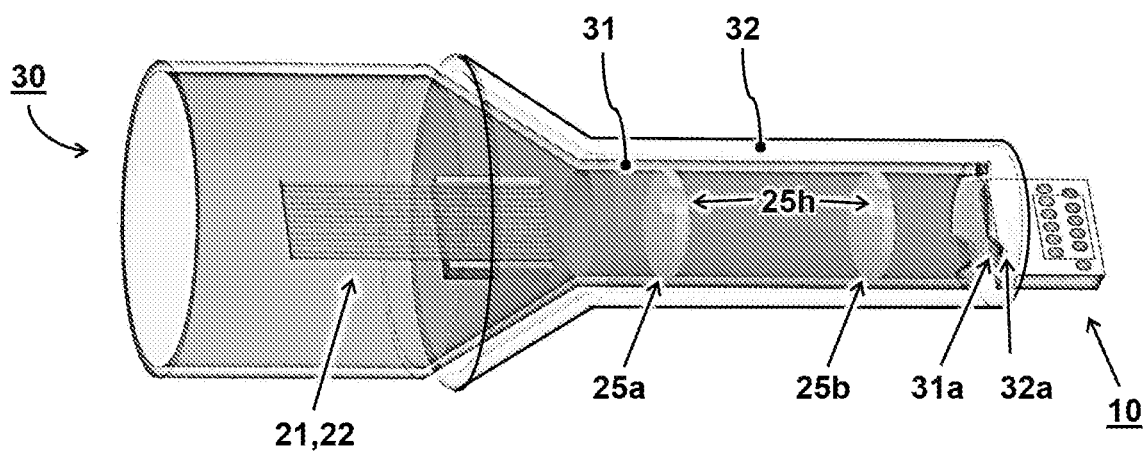
FIG. 3C illustrates a perspective view of an embodiment of a probe head with liquid tight sleeve and optical chip.

FIG. 3C illustrates a perspective view of an embodiment of a probe head 31 with liquid tight sleeve 32 and optical chip 10. In one embodiment, a connection between the probe head 31 and the sleeve 32 determines a relative rotation of the optics 21,22,25a,25b inside the optical instrument 30 with respect to the optical chip 10. For example, the probe head 31 and the sleeve 32 comprise cooperating parts 31a,32a that determine a relative orientation there between to establish the optical path between the light guides 21,22 and the optical couplers 11,12 via the projection optics 25a,25b. In a preferred embodiment, the connection between the probe head 31 and the sleeve 32 comprises an isostatic mount. In the embodiment shown, the mound has three indentations that fit on three extensions on the read-out optics, located in a plane perpendicular to the optical axis and hundred-twenty degree separated. This has the advantage that the thermal centre is located on the optical axis, such that the chip remains aligned with the read-out optics at any temperature.

In some embodiments, the sleeve 32 is held by the optical instrument 30 using a suction mechanism sucking air from the probe head 31 to suck the sleeve 32 there against. Also other mechanisms can be envisaged for holding the sleeve, e.g. magnetic, mechanical, clamping, etc. Typically, the probe head 31 comprises one or more lenses 25a,25b between the light guides 21,22 and the optical chip 10. In the embodiment shown, the lenses 25a,25b comprise holes 25h to allow air suction through the probe head 31.

Figure 4:
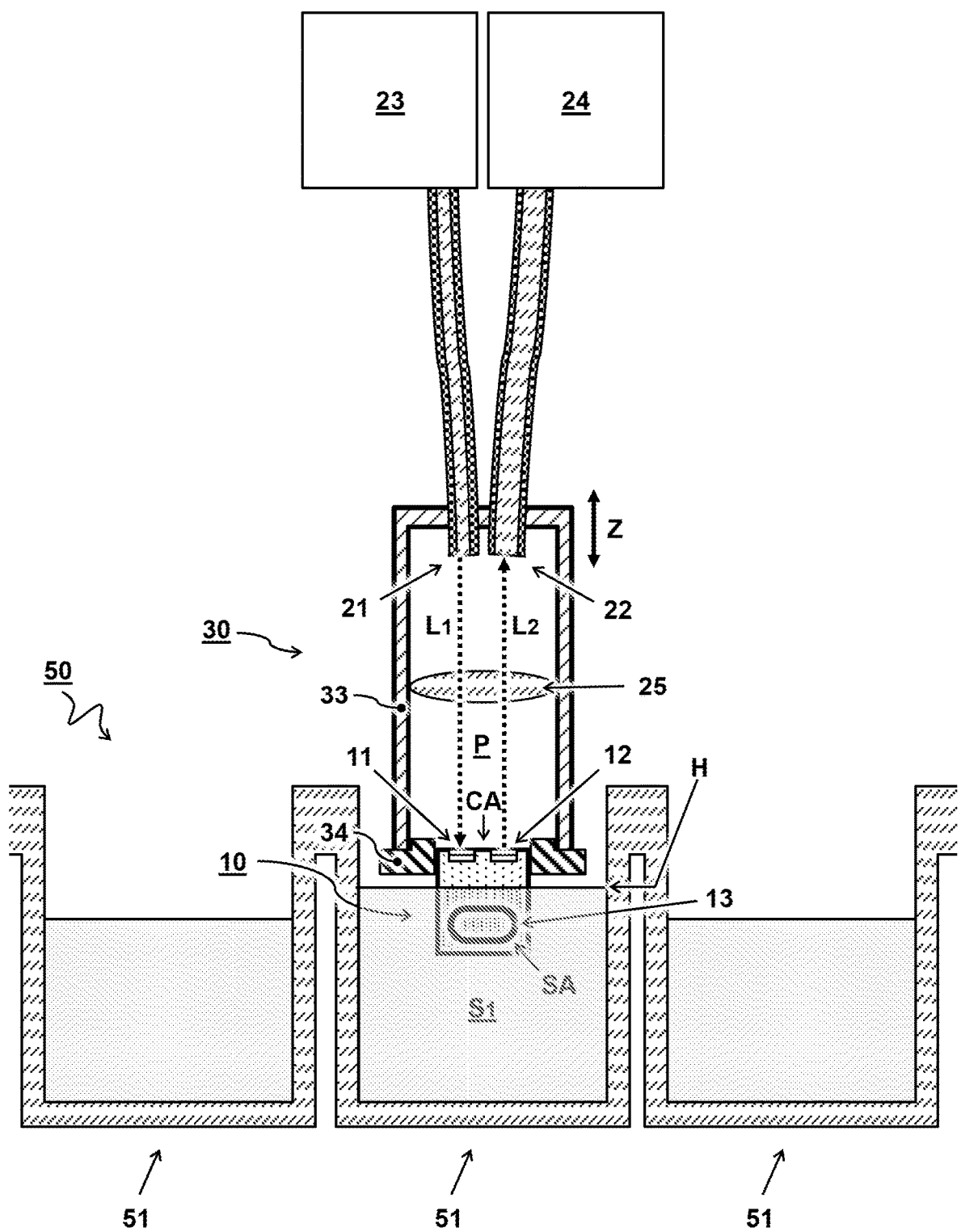
FIG. 4 illustrates a cross-section view of an embodiment for measuring a liquid sample in a well by means of a chip that is partially kept above the liquid level.

FIG. 4 illustrates a cross-section view of an embodiment for measuring a liquid sample S1 in a well 51 by means of an optical chip 10 that is partially kept above the liquid fluid level H.

In the embodiment shown, the optical chip 10 is held partially above a fluid level H of the liquid sample S1 with the sampling area SA of the optical chip 10 below the fluid level H to expose it to the liquid sample S1. Furthermore, the coupling area CA is held above the fluid level H to keep it free of the liquid sample S1. Accordingly, the optical path P extends through free space from the coupling area CA above the fluid level H. In one embodiment, the optical sensor 13 is used for sensing the fluid level H while the optical chip 10 is lowered by an actuator along a direction Z into the liquid sample S1. For example, an optical instrument 30 holding the optical chip 10 is lowered into the liquid sample S1 to dip the sampling area SA below the fluid level H while keeping the coupling area CA above the fluid level H. Preferably, the optical instrument 30 comprises a reusable part 33, e.g. with optics 25 et cetera. The reusable part 33 may couple to a disposable part 34 connected to the chip 10. For example, the disposable part 34 comprises a plate glued to the chip wherein the plate is sucked against the reusable part 33 to form an optical coupling.

In one embodiment, a first light guide 21 is connected to a light source 23, e.g. comprising a laser. In another or further embodiment, a second light guide 22 is connected to a detector 24, e.g. comprising a spectrometer. Multiple light guides may be connected to the light source and/or detectors. In some embodiments, light guides for input light L1 and output light L2 may be (partly) combined.

FIG. 5A illustrates an overview of example components in an optical measurement system. One embodiment of the system comprises a probe head 31 with projection optics 25 for providing input light L1 onto the optical chip 10 and receive output light L2 from the optical chip 10. In some embodiments, the probe head 31 is positioned by an actuator 35. For example the actuator may position a probe head with respect to the chip in dimensions x,y,z. Also other movements can be used, e.g. rotations Rx,Ry,Rz (not shown). Also combinations may provide benefit, e.g. x,y,Rz (rotation around z-axis).

Typically, the system comprises a laser 23 or other light source. For example, the laser comprises a laser diode LD and a laser driver DRIV configured to provide electrical current ILAs to the laser. In some embodiments, the system comprises analog front-end electronics 41 and/or digital back-end electronics 42. For example, the analog front-end electronics 41 comprise digital to analog converters DAC and/or analog to digital converters ADC. In the embodiment shown, light from the laser diode LD is partly coupled to a photo diode PD which provides a reference current $T_{REF}$, and/or any other reference signal such as wavelength. Light signal L2 captured by the optical fiber 22 may be measured using anther photo diode PD which provides a signal current $I_{SIG}$. The currents may be converted to voltages by respective trans impedance amplifiers TIA, which voltages may be digitized using ADCs for processing by the digital back-end electronics 42. In the embodiment shown, the digital electronics 42 also controls the actuator 35 which moves the probe head 31 with respect to the optical chip 10.

In one embodiment, the probe head 31 is moved in dependence of a signal detection from the optical chip 10. In some embodiments, the system comprises a computer readable storage medium with program instructions that when read by the system cause the system to perform operational acts in accordance with the present disclosure. For example the system may position an optical instrument with respect to an optical chip 10 or position the optical chip 10 with respect to the liquid sample. For example, the system may establish an optical coupling with the chip. For example, the system may optically interrogate the chip. In one embodiment, a monochromatic wavelength of the laser is varied over a wavelength range to and the response is measured to determine a spectrum of the optical sensor 13.

FIG. 5B illustrates a relatively large light spot L1 projected over a free space input coupler 11. FIG. 5C illustrates a relatively small light spot L1 projected over a free space input coupler 11. In the embodiment shown, the optical coupler 11 comprises a grating coupler, e.g. vertical grating coupler. Also other couplers are possible, e.g. edge couplers such as shown in the embodiment of FIG. 6A.

Preferably, the optical coupler 11,12 is configured to operate as a free space coupler without direct physical contact of external light guides such as optical fibers to the coupling area. Depending on the embodiment, the coupling area may be exposed to free space or in contact with the well surface. It will be noted that the well surface 51a is not considered a light guide in this regard, but simply a medium for propagating the light because it has no specific function of directional guidance. For example, the well surface need not be aligned with the optical coupler 11,12 as would be the case for an external fiber.

In one embodiment, the optical coupler 11,12 has a diameter for receiving and/or emitting light. Typically, the diameter is less than hundred micrometer, less than fifty micrometers, or even less than twenty micrometers, e.g. between five and fifteen micrometers. In some embodiments, an input coupler 11 is exposed to a light spot of input light L1, wherein the light spot completely covers an area of the input coupler 11. In one embodiment, a diameter D1 of the input light spot is at least hundred micrometers, preferably at least two hundred micrometers. Increasing the light spot diameter can make alignment easier but at the cost of lower light intensity. Preferably, a diameter D1 of the input light spot is thus larger than a diameter of the input coupler 11 e.g. by at least a factor two, three, five, ten, twenty, or even forty, e.g. a factor between two and hundred, preferably between ten and fifty.

Figure 6A:
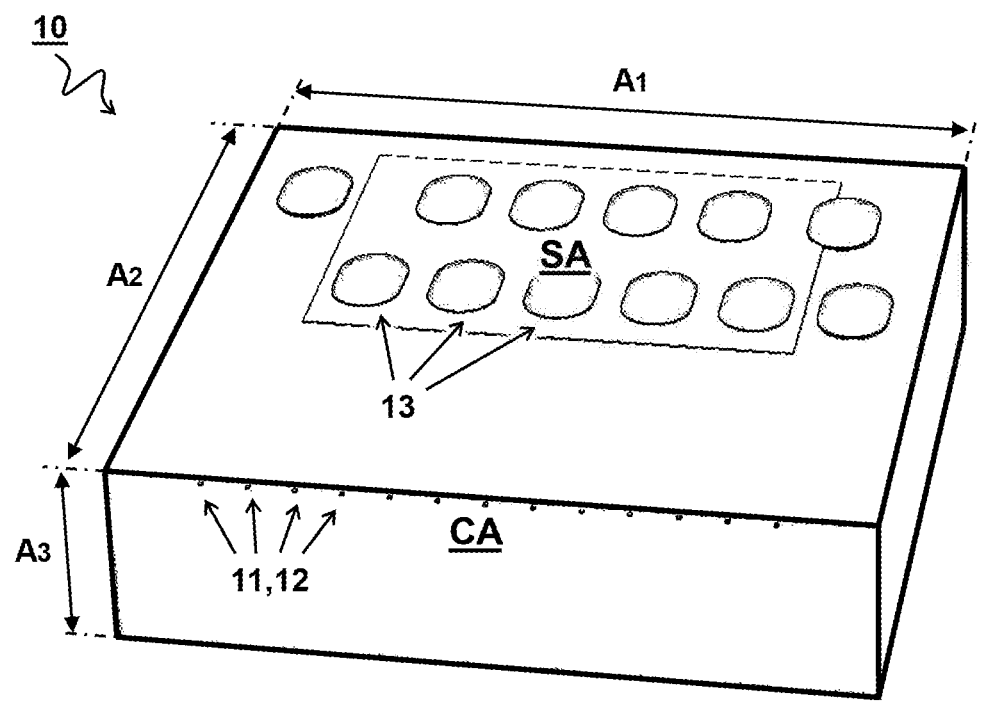
FIG. 6A illustrates a perspective view of an embodiment of an optical chip.

FIG. 6A illustrates a perspective view of an embodiment of an optical chip 10. The optical chip 10 has a plurality of optical sensors 13 on at a sampling area SA at top surface and a plurality of optical couplers 11,12 at a front surface near the top. Of course the chip can also have other dimensions than shown.

Figure 6B:
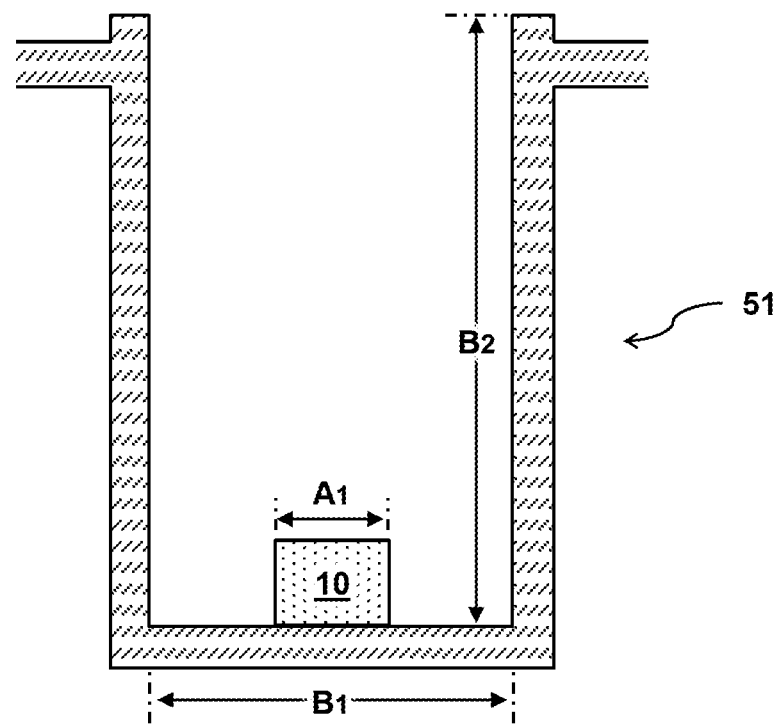
FIG. 6B illustrates an example for relative sizes of the optical chip with respect to the well.

FIG. 6B illustrates an example for relative sizes of the optical chip 10 with respect to the well 51. Preferably, the optical chip 10 is dimensioned to fit inside a well 51 of the well plate 50. In one embodiment, the optical chip has dimensions A1,A2,A3 that are smaller than a diameter B1 of the well 51 by a factor of at least one-and-half, at least two, or at least three. For example, the well plate 50 comprises wells 51 with a diameter B1 of less than ten millimeters, less than seven millimeters, or even less than five millimeters, e.g. between two and ten millimeters. For example, the wells 51 have a depth less than twenty millimeters, less than fifteen millimeters, less than ten millimeters, or even less than five millimeters, e.g. between two and fifteen millimeters. For example, a largest dimension A1 of the optical chip 10 is less than five millimeter, less than four millimeter, or even less than three millimeter, e.g. between one and two millimeter.

Figure 7A:
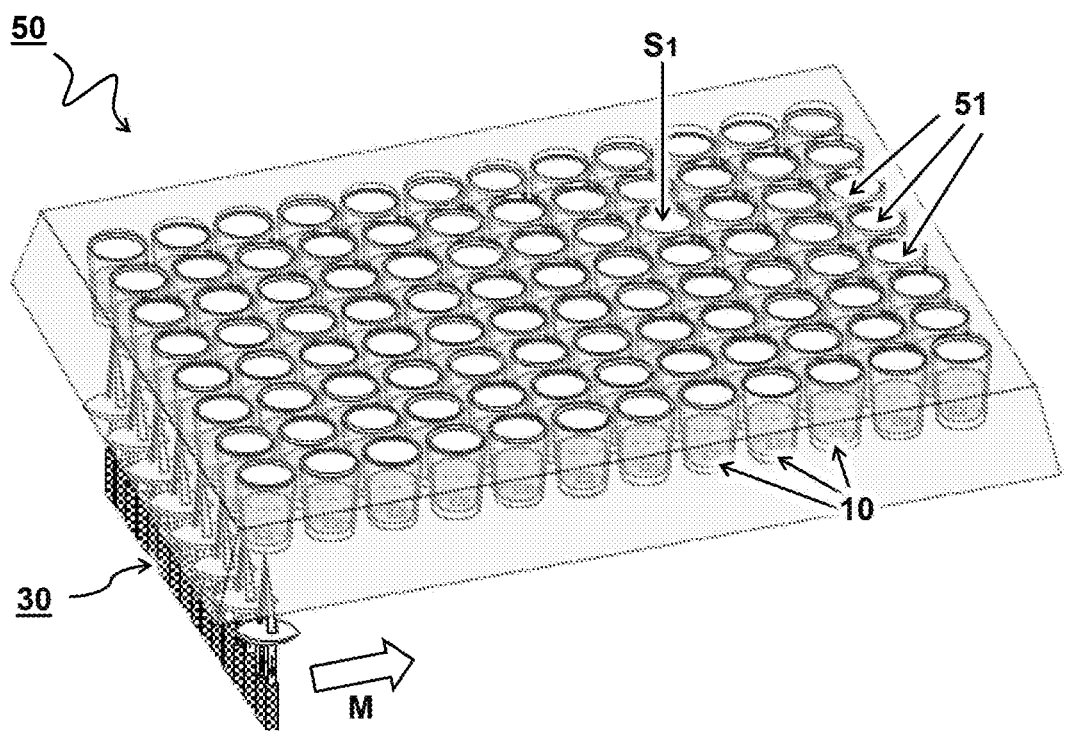
FIG. 7A illustrates an embodiment for readout of a well plate with chips from the bottom.

FIG. 7A illustrates an embodiment for readout of a well plate 50 with chips 10 from a bottom surface of the wells 51. Some aspects of the present disclosure relate to a well plate 50 for measuring a liquid sample S1. The well plate 50 comprises a plurality of wells 51, wherein one or more wells comprise a respective optical chip 10 as described herein. The optical chip 10 is arranged to be submerged with the sampling area in the liquid sample S1 while the liquid sample S1 is kept away from the coupling area for interrogating the optical coupler via an optical path that does not pass through the liquid sample S1.

In one embodiment, the optical chips 10 are interrogated by an optical instrument 30 from a bottom of the well plate 50. For example, the optical instrument 30 is moved along a trajectory M with respect to the well plate 50, to read out different optical chips 10. In some embodiments, the optical instrument 30 comprises a plurality of channels for simultaneous readout of multiple chips 10. For example, each channel comprises respective optical fibers to deliver and receive the input light L1 and output light L2. The channels may comprise shared or dedicated projection optics, e.g. a lens array. In the embodiment shown, the channels are disposed in a row configuration. Also other configurations are possible. Preferably, the number of channels equals the number of wells 51 in a row of the well plate 50. In one embodiment, the optical instrument 30 is moved along a trajectory M transverse to the rows of the well plate, wherein the optical instrument 30 simultaneously reads out a row of chips in respective wells 51.

Figure 7B:
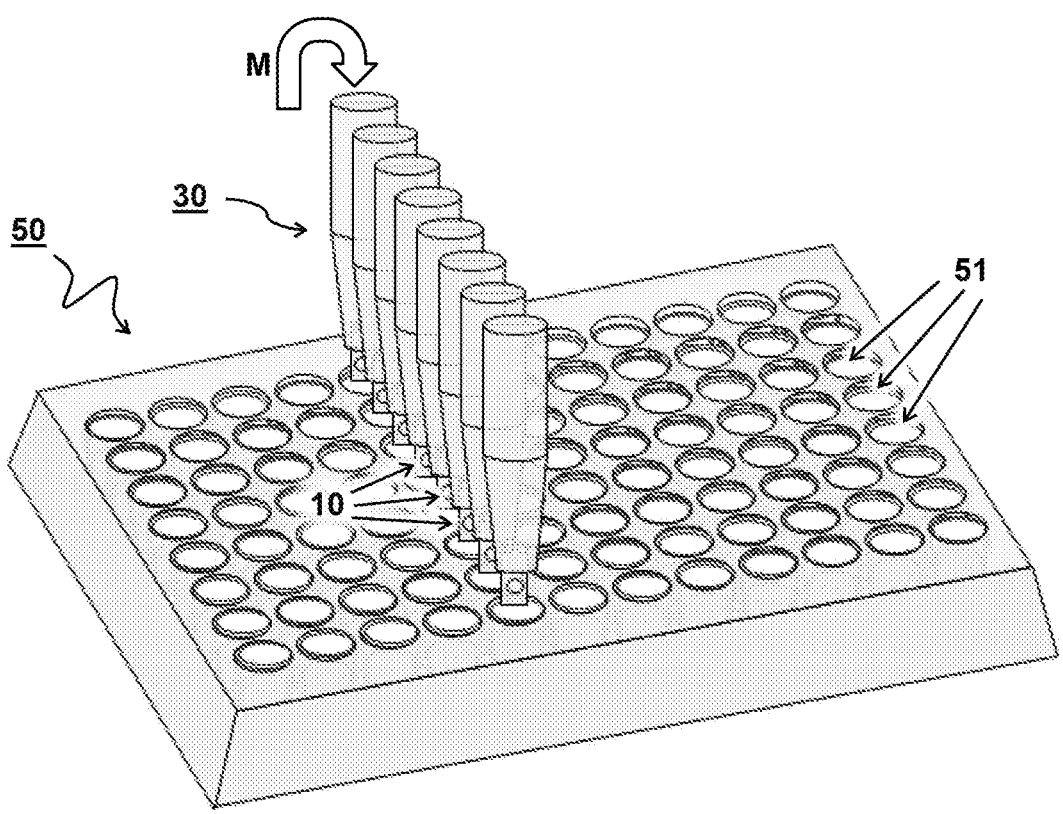
FIG. 7B illustrates an embodiment for readout of a well plate by an instrument clipping chips in the wells.

FIG. 7B illustrates an embodiment for readout of a well plate by another instrument 30 dipping chips 10 in the wells 51 for measurement. Some aspects of the present disclosure relate to an optical instrument 30 for measuring a liquid sample S1 in a well plate 50, wherein the optical instrument 30 comprises or couples to one or more optical chips 10 as described herein. The optical chip 10 is arranged to be submerged with the sampling area in the liquid sample S1 while the liquid sample S1 is kept away from the coupling area for interrogating the optical coupler via an optical path that does not pass through the liquid sample S1.

In one embodiment, a plurality of optical chips 10 is held by an optical instrument 30 and simultaneously or sequentially clipped in respective wells 51 of the well plate 50. Preferably, the optical instrument 30 is configured to pick up new (disposable) optical chips 10 for each next measurement of a plurality of wells. Alternatively, the same optical chips are reused, e.g. the optical chips are cleaned between measurements.

Figure 8A:
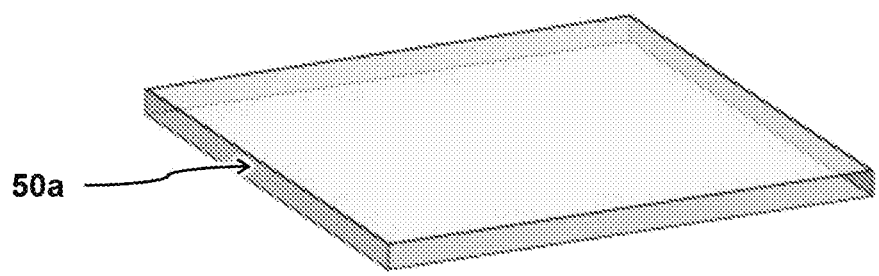
FIGS. 8A-8C illustrate an embodiment for constructing a well plate with chips.
Figure 8B:
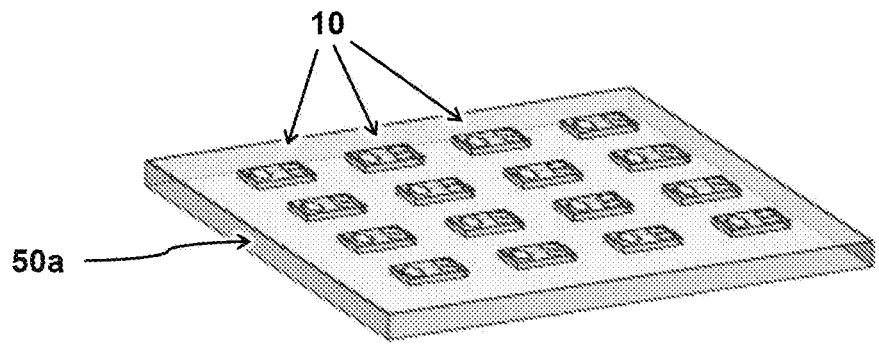
Figure 8C:
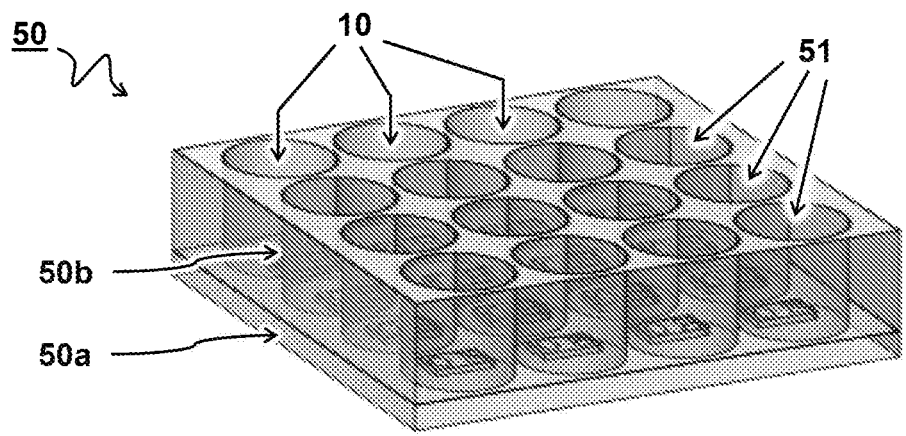

FIGS. 8A-8C illustrate an embodiment for constructing a well plate with chips. In one embodiment, a well plate 50 is manufactured by placing a plurality of optical chips 10 onto a transparent bottom part 50a and placing a top part 50b onto the bottom part 50a. Preferably, the top part 50b has a plurality of openings there through fitting over the optical chips 10 to form a plurality of wells 51 with respective optical chips 10 at the bottom. For example, the openings are arranged in a matrix. Preferably, the top part 50b is formed by a monolithic block with openings.

FIG. 9A illustrates a picture of an embodiment optical sensor as ring resonator. FIG. 9B illustrates coating on the ring resonator for detecting an analyte. FIG. 9C illustrates a graph with wavelength shift Δλ of spectral features as function of analyte concentration. FIG. 9D illustrates the wavelength shift Δλ as function of time "t". In one embodiment, the optical sensor 13 comprises a ring resonator. In another or further embodiment, the optical sensor 13 comprises a Mach-Zehnder interferometer (not shown), which can additionally be used to measure wavelength. Also other optical sensors may be used. For example, the liquid sample S1 comprises an analyte C1 that is detected by binding to a receptor Cs on a surface of the optical sensor 13. The binding may affect the optical properties of the sensor, e.g. refractive index of the ring resonator which in turn can be detected as a shift in the spectrum of light coupling with the resonator via adjacent light guides. Various properties of the sample may be measured, e.g. temperature, pressure, acidity, oxygen, biomarkers, et cetera.

For the purpose of clarity and a concise description, features are described herein as part of the same or separate embodiments, however, it will be appreciated that the scope of the invention may include embodiments having combinations of all or some of the features described. For example, while embodiments were shown for optical chips in being connected to a well plate or held by an instrument, also alternative ways may be envisaged by those skilled in the art having the benefit of the present disclosure for achieving a similar function and result. E.g. optical systems may be combined or split up into one or more alternative components.

The various elements of the embodiments as discussed and shown offer certain advantages, such as mass measurement of samples using optical chips. Of course, it is to be appreciated that any one of the above embodiments or processes may be combined with one or more other embodiments or processes to provide even further improvements in finding and matching designs and advantages. For example, while the present disclosure emphasizes advantages of keeping fluid away from the optical coupling, it will be appreciated that other or further aspects can provide synergetic or separate advantages. Further aspects of the present disclosure may e.g. reside in advantages associated with methods and systems employing lenses for establishing a remote coupling with the optical chip instead of contacting the chip with optical fibers. Such remote coupling, as described herein, may be less sensitive to placement tolerance and/or pollution. In some cases, remote coupling with lenses can also be used to traverse a layer of fluid, although this may require some further alignment and/or cleaning of the coupling. In this regard it is preferably to use a combination of remote coupling via a fluid-free optical path.

Overall, it is appreciated that this disclosure offers particular advantages to chemical and biological analysis of samples, and in general can be applied for any application wherein free-space measurement of optical chips in small sample containers is desired. Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A method of measuring a liquid sample, the method comprising
providing a liquid tight sleeve with a distal side holding an optical chip and a proximal side having an access opening, the optical chip comprising:
an optical sensor that is accessible to the liquid sample at a sampling area of the chip, and
at least one free-space optical coupler that is accessible to receive input light and/or emit output light via one or more input and/or output couplers in a coupling area of the chip,
wherein the optical chip is configured to modify the output light with respect to the input light as a function of a property to be measured of the liquid sample proximate to the sampling area;
wherein the at least one free-space optical coupler of the optical chip is disposed inside the liquid tight sleeve for shielding the coupling area from the liquid sample, while the optical sensor is disposed outside the liquid tight sleeve for allowing the sampling area to be exposed to the liquid sample;
inserting a probe head of an optical instrument at least partly inside the liquid tight sleeve via the access opening to pick up and hold the optical chip via the liquid tight sleeve with the probe head inserted inside; and
dipping the probe head with the liquid tight sleeve into the liquid sample to lower the optical chip into the liquid sample thereby submerging the sampling area in the liquid sample below a fluid level of the liquid sample while keeping the liquid sample away from the coupling area by the liquid tight sleeve between the liquid sample and the optical chip to interrogate the optical coupler via an optical path that extends from the coupling area through an interior free space inside the liquid tight sleeve to a projection system of the optical instrument inside the probe head without passing through the liquid sample.

2. The method according to claim 1, wherein the optical chip is integrally connected to the liquid tight sleeve to form a liquid tight interior space, wherein one or more optical couplers of the optical chip are arranged at an inside of the sleeve facing the interior space, wherein one or more optical sensors of the optical chip are arranged at an outside of the sleeve.

3. The method according to claim 1, wherein the probe head of the optical instrument has a protrusion that tightly fits inside a liquid tight sleeve, wherein a connection between the probe head of the optical instrument and the sleeve establishes the optical path between light guides inside the optical instrument and the coupling area of the optical chip.

4. The method according to claim 3, wherein the probe head and the sleeve comprise cooperating parts that determine a relative orientation there between to establish the optical path between the light guides and the optical couplers via the projection optics.

5. The method according to claim 1, wherein the liquid tight sleeve with the optical chip is held by the optical instrument using a suction mechanism sucking air from the probe head to suck the sleeve there against.

6. The method according to claim 1, wherein the optical chip is dimensioned to fit completely inside a well of the well plate.

7. The method according to claim 1, wherein the optical chip comprises a free-space input coupler configured to receive input light for the optical sensor into the chip, wherein the input light is imaged from a remote light source as a light spot onto a part of the coupling area associated with the input coupler.

8. The method according to claim 1, wherein the input light is imaged by the projection optics from an optical exit surface of a first light guide.

9. The method according to claim 8, wherein the same projection optics are used to image the output light from an output coupler of the chip onto a second light guide.

10. The method according to claim 8, wherein the first light guide for delivering the input light has a smaller diameter than the second light guide for receiving the output light, by a factor of at least two.

11. The method according to claim 10, wherein the light guides comprise an optical fibers.

12. The method according to claim 11, wherein the first light guide comprises a single mode fiber and the second light guide comprises a multimode fiber.

13. A method of measuring a liquid sample, the method comprising:
providing a well plate comprising a plurality of wells, each well configured to separately hold a respective liquid sample and comprising a respective optical chip adhered to a respective bottom surface inside a respective well of the well plate submerged below a fluid level of the respective liquid sample, wherein each optical chip comprises an optical sensor at a sampling area on a first side of the chip, and at least one free-space optical coupler that is accessible to receive input light and/or emit output light via one or more input and/or output couplers in a coupling area disposed on a second side of the optical chip, opposite the first side, wherein the optical chip is configured to modify the emitted output light with respect to the received input light as a function of a property to be measured of the liquid sample proximate to the sampling area, wherein the optical sensor of the respective optical chip contacts the respective liquid sample inside the respective well, wherein the coupling area of the respective optical chip is in contact with the respective bottom well surface on the inside of the respective well, wherein the respective bottom well surface shields the coupling area of the respective optical chip from the respective liquid sample and is transparent to the input and output light,
providing an optical instrument aligned with respect to a bottom of the well plate to interrogate a first optical chip in a first well of the plurality of wells via the respective bottom well surface of the first well; and
moving the optical instrument with respect to the bottom of the well plate to interrogate a second optical chip in a second well of the plurality of wells via the respective bottom well surface of the second well.

14. The method according to claim 13, wherein the respective optical chip is attached by an adhesive to the respective bottom well surface.

15. The method of claim 13, wherein said interrogating comprises focusing respective input light of the optical instrument through the transparent respective bottom well surface of the respective well onto the one or more input couplers in the respective coupling area of the respective optical chip adhered to the respective bottom well surface inside the respective well, and receiving respective output light from the one or more output couplers in the respective coupling area of the respective optical chip by the optical instrument through the transparent well surface of the respective well.

16. The method of claim 13, wherein the well plate comprises at least ten wells arranged in a matrix.

17. A well plate comprising a plurality of wells arranged in a rectangular matrix configuration, each well configured to separately hold a respective liquid sample and comprising a respective optical chip adhered to a respective bottom surface inside a respective well of the well plate configured to be submerged below a fluid level of the respective liquid sample to separately measure the respective liquid sample, wherein each optical chip comprises an optical sensor at a sampling area on a first side of the chip, and at least one free-space optical coupler that is accessible to receive input light and/or emit output light via one or more input and/or output couplers in a coupling area disposed on a second side of the optical chip, opposite the first side, wherein the optical chip is configured to modify the emitted output light with respect to the received input light as a function of a property to be measured of the liquid sample proximate to the sampling area, wherein the optical sensor of the respective optical chip contacts the respective liquid sample inside the respective well, wherein the coupling area of the respective optical chip is in contact with the respective bottom well surface on the inside of the respective well, wherein the respective bottom well surface shields the coupling area of the respective optical chip from the respective liquid sample and is transparent to the input and output light of the optical chip.

18. The well plate of claim 17 comprising at least ten wells.

* * * * *